US011161251B2

(12) United States Patent
Knopf et al.

(10) Patent No.: US 11,161,251 B2
(45) Date of Patent: Nov. 2, 2021

(54) SELF-CONTAINED ROBOTIC GRIPPER SYSTEM

(71) Applicant: Soft Robotics, Inc., Cambridge, MA (US)

(72) Inventors: Ryan Knopf, Melrose, MA (US); Joshua Aaron Lessing, Cambridge, MA (US); Daniel Vincent Harburg, Amsterdam (NL); Grant Sellers, Cambridge, MA (US); Kevin Alcedo, Coral Springs, FL (US)

(73) Assignee: SOFT ROBOTICS, INC., Cambridge, MA (US)

( * ) Notice: Subject to any disclaimer, the term of this patent is extended or adjusted under 35 U.S.C. 154(b) by 98 days.

(21) Appl. No.: 16/567,364

(22) Filed: Sep. 11, 2019

(65) Prior Publication Data
US 2020/0078957 A1    Mar. 12, 2020

Related U.S. Application Data

(63) Continuation of application No. 16/037,748, filed on Jul. 17, 2018, now Pat. No. 10,576,640, which is a
(Continued)

(51) Int. Cl.
*B25J 15/00* (2006.01)
*B25J 15/12* (2006.01)
(Continued)

(52) U.S. Cl.
CPC .......... *B25J 15/0023* (2013.01); *B25J 9/142* (2013.01); *B25J 15/10* (2013.01); *B25J 15/12* (2013.01)

(58) Field of Classification Search
CPC ........ B25J 15/0023; B25J 9/142; B25J 15/10; B25J 15/12
See application file for complete search history.

(56) References Cited

U.S. PATENT DOCUMENTS 5,080,000 A * 1/1992 Bubic ...................... B25J 18/06
294/119.3
5,156,081 A * 10/1992 Suzumori ................ B25J 15/12
91/525
(Continued)

FOREIGN PATENT DOCUMENTS

JP          4111792 B2    7/2008

*Primary Examiner* — Stephen A Vu
(74) *Attorney, Agent, or Firm* — Kacvinsky Daisak Bluni PLLC

(57) ABSTRACT

Exemplary embodiments relate to improvements in soft robotic systems that permit a soft robotic end effector to be a self-contained system, without reliance on a tether to deliver inflation fluid to the actuator(s) of the end effector. According to some embodiments, a robotic system may be provided including a soft actuator and a hub. The body of the hub may include an integrated pressure source configured to supply inflation fluid through the actuator interface to the soft actuator. The pressure source may be, for example, a compressor (such as a twin-head compressor) or a reaction chamber configured to vaporize a fuel to create a high-temperature pressurized gas and deliver the pressurized gas to the actuator One or more accumulators may receive inflation fluid (or a partial vacuum) from the compressor over time, and store the inflation fluid under pressure, thus allowing actuation over a relatively short time period.

18 Claims, 8 Drawing Sheets

Related U.S. Application Data continuation of application No. 15/225,364, filed on Aug. 1, 2016, now Pat. No. 10,046,462.

(60) Provisional application No. 62/199,029, filed on Jul. 30, 2015.

(51) Int. Cl.
  *B25J 9/14* (2006.01)
  *B25J 15/10* (2006.01)

(56) References Cited

U.S. PATENT DOCUMENTS

| | | | |
|---|---|---|---|
| 2003/0032855 A1* | 2/2003 | Shahinpoor | A61M 60/268 600/16 |
| 2003/0110938 A1* | 6/2003 | Seto | B25J 9/142 92/92 |
| 2006/0028041 A1* | 2/2006 | Ono | B25J 15/10 294/119.3 |
| 2010/0319341 A1* | 12/2010 | Blitz | F15B 15/125 60/530 |
| 2015/0360372 A1* | 12/2015 | Schiettecatte | B29C 64/135 294/197 |

* cited by examiner

SELF-CONTAINED ROBOTIC GRIPPER SYSTEM

RELATED APPLICATIONS

This application is a Continuation of U.S. patent application Ser. No. 16/037,748, filed Jul. 17, 2018, which is a Continuation of U.S. patent application Ser. No. 15/225,364, filed on Aug. 1, 2016, which claims priority to U.S. Provisional Patent Application Ser. No. 62/99,029, filed on Jul. 30, 2015 and entitled "Self-Contained Soft Robotic Gripper Systems." The contents of the aforementioned application are incorporated herein by reference.

BACKGROUND

Robotic systems are employed in a number of different contexts, and may be called upon to perform a wide variety of different tasks. Robots typically manipulate objects around them using robotic manipulators such as individual actuators, grippers, or end effectors.

Recently, soft robotic actuators have been adopted in a number of contexts. Unlike traditional hard robotic actuators formed of metal or hard plastic, soft robotic actuators may be formed of elastomeric materials, such as rubber, or thin walls of plastic arranged in an accordion structure that is configured to unfold, stretch, twist and/or bend under pressure, or other suitable relatively soft materials. Soft robotic materials are adaptive, inexpensive, lightweight, customizable, and simple to use.

One issue that may arise in the context of soft robotic actuators is that the actuators must be pressurized, which is typically achieved by filling the actuators with an inflation fluid. Often, this inflation fluid is supplied via a fluid line, which tethers the robotic system (e.g., a robotic arm) to a pressurization system. This issue, and other issues described in more detail herein, may prevent a soft robotic system from being fully self-contained.

SUMMARY

Exemplary embodiments relate to improvements in soft robotic systems that permit a soft robotic end effector to be a self-contained system, without reliance on a tether to deliver inflation fluid to the actuator(s) of the end effector.

According to some embodiments, a robotic system may be provided including a soft actuator and a hub. The soft actuator may include an elastomeric bladder configured to receive an inflation fluid. The hub may include a first end having an actuator interface configured to receive the soft actuator. A second end of the hub may include a mounting flange configured to be mounted to a robotic arm or other robotic system.

The body of the hub may include an integrated pressure source configured to supply inflation fluid through the actuator interface to the soft actuator. The pressure source may be, for example, a compressor for directly or indirectly pressurizing the actuator (e.g., through an accumulator). In some embodiments, the pressure source may be a reaction chamber separate from the actuator and configured to perform a reaction of chemical reagents (e.g. combustion of a fuel) thereby generating and storing the gaseous products of the reaction to be subsequently delivered as an inflation fluid directly or indirectly.

An accumulator may receive inflation fluid from the compressor over time, and store the inflation fluid under pressure. Accordingly, actuation of the actuator can take place in a shorter time period as compared to when a compressor is used alone. In some embodiments, multiple accumulators may be employed. A first accumulator may serve as a positive pressure vessel for pressurizing the actuator, and a second accumulator may serve as a negative pressure vessel for de-pressuring the actuator. One or more accumulators may be connected to an actuator (and to each other) and may be collectively sized along with the actuator so that, when a fluid conduction path is created between the accumulator(s) and an integrated end effector, a predetermined actuation pressure or partial vacuum is achieved as a consequence of the inflation fluid equilibrating within the now larger connected volume.

Between the pressure source and the actuator may be disposed a directional control valve for permitting the flow of an inflation fluid in a first direction and/or removing the inflation fluid to create a partial vacuum in a second direction. A flow control valve may also be used to control the rate at which the inflation fluid enters or leaves the actuator.

According to some embodiments, a twin-head compressor may be used. The twin-head compressor may be configured to operate in parallel or in series, depending on the configuration of a control valve. A controller may be configured to activate the control valve at a time corresponding to when flow profiles of each compressor head intersect.

The compressor may be powered by a motor. In some embodiments, the motor may be operated outside of its normal specifications, such as by being driven at an elevated voltage or current. Thus, for infrequent actuations, the actuator can be inflated more quickly while still allowing sufficient time to dissipate the extra heat generated by the overpowered motor. Heat can be further dissipated by providing a heat exchanger proximal to the motor. The heat exchanger may exchange heat between the motor and the inflation fluid. Due to the expansion of the inflation fluid as it enters the actuator, the inflation fluid may rapidly cool. This phenomenon can be exploited to actively cool the overpowered motor. Elevated inflation fluid temperatures resulting from this configuration have the functional benefit of further increasing pressure developed on the actuator.

In still further embodiments, the hub may be a three-part hub, where the parts are connectable to form the hub. A first part proximal to a robotic arm may include a pump and control valves for receiving an inflation fluid and supplying the inflation fluid to the second part.

The second part may be made up of or may include an integrated accumulator. The accumulator may conform to the shape of the hub and therefore may conserve space in the hub/end-effector system. For example, the accumulator may be rectangular, with oddly-shaped voids; it may be non-cylindrical or non-spherical. A septum may be provided in the accumulator to divide the internal structure of the second part of the hub into positive and negative pressure chambers.

A third part of the hub may include a valve for supplying the inflation fluid from the accumulator to one or more connected soft robotic actuators A pneumatic flow path may be integrated into the structural body of the hub, thus reducing or eliminating the need for internal pneumatic connections and conduction paths which unnecessarily increase the overall volume occupied by the hub.

Although exemplary embodiments are described in connection with soft robotic actuators disposed at the end of a robotic arm, one of ordinary skill in the art will recognize that these techniques are applicable to soft actuators in other contexts, as well.

DETAILED DESCRIPTION

Figure 1A:
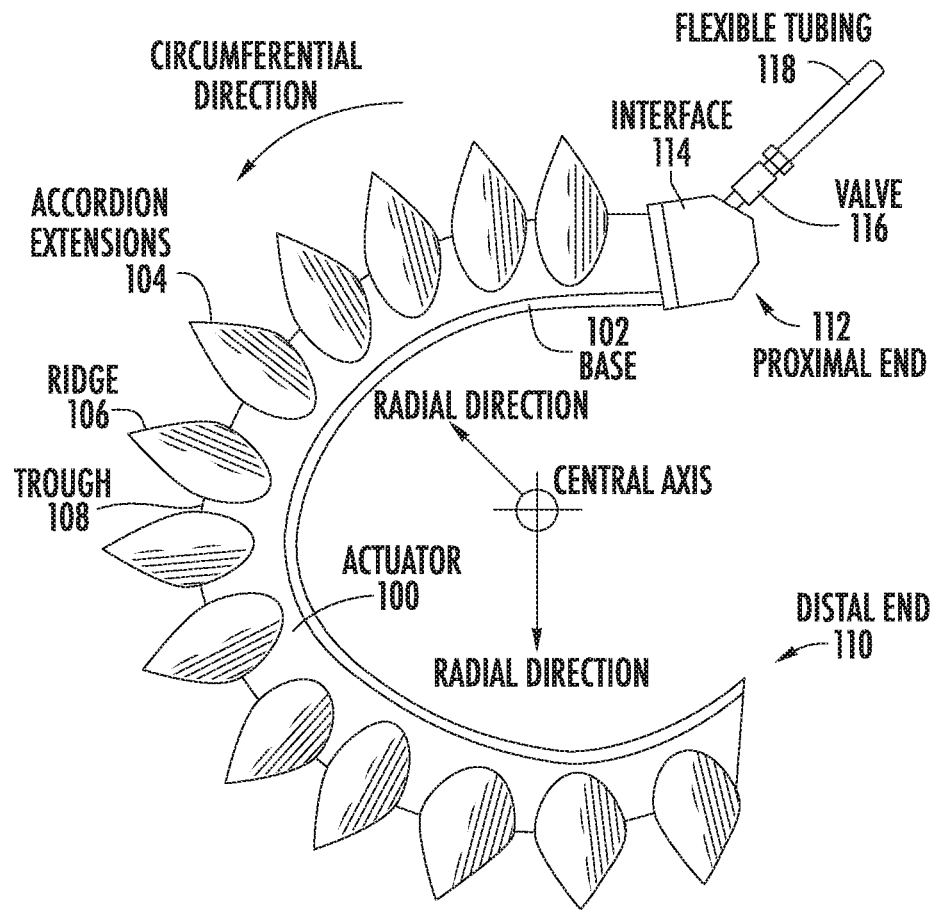
FIGS. 1A-1D depict exemplary soft robotic actuators suitable for use with exemplary embodiments described herein.

Exemplary embodiments relate to robotic systems that are designed or configured to provide self-contained soft robotic end effector systems.

A soft robotic end of arm tool (EOAT) may be mounted to the end of a robotic manipulator. These manipulators have a specified payload capacity which they are able to maneuver without negatively affecting the dynamics of the arm. This permissible payload size, weight, and moment of inertia is often many times smaller than that of the controlling manipulator itself, thus smaller achievable payloads yield disproportionately improved installation power and space requirements. Furthermore, after installing the soft robotic EOAT sufficient capacity must remain for the manipulation target (object to be moved or reoriented). A self-contained soft robotics end effector system must be very efficient in its design to ensure that its final physical properties are comparable to a traditional tethered soft robotics end effector. While self-contained systems may be slightly larger or heavier, they must not impair the broader manipulation system's ability to maneuver and grasp within confined and crowded spaces.

Aside from its physical properties, the creation of a fully self-contained soft robotic control system is subject to many other challenges and constraints. Sourcing sufficient electrical power to compress gas or space to store compressed or liquefied gas is difficult within the form factor of the EOAT itself. However, when paired with a mobile robotic platform as a host, it is possible to distribute these subsystems throughout the mobile robotic platform to remove larger system components from the EOAT itself. For example, a larger compressor and receiver tank for compressed gas storage or liquefied gas storage may be positioned within the base of the mobile robotic platform, where the battery and drive system of the platform would already be located to provide ballast. Only smaller integrated systems such as directional control valves, flow control valves, or sensing components would remain beside the soft actuators and interfacing hub that comprise the EOAT. To alleviate the space, weight, and electrical power demands imposed on the host platform, the compressor size and power consumption or actuation fluid storage and media must be heavily optimized. The following sections describe several techniques for providing self-contained soft robotic control systems and the mobile systems that integrate them.

A brief overview of soft robotic actuators and grippers will first be provided, followed by a detailed description of various aspects of exemplary embodiments. Unless otherwise noted, it is contemplated that each of the described embodiments may be used in any combination with each other.

Background on Soft Robotic Grippers

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold, stretch, twist and/or bend under pressure, or other suitable relatively soft materials. They may be created, for example, by molding one or more pieces of the elastomeric material into a desired shape. Soft robotic actuators may include a hollow interior that can be filled with a fluid, such as air, water, or saline to pressurize, inflate, and/or actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends, twists, and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. They can also deflect upon collision with an object, which may be particularly relevant when picking an object off of a pile or out of a bin, since the actuator is likely to collide with neighboring objects in the pile that are not the grasp target, or the sides of the bin. Furthermore, the amount of force applied can be spread out over a larger surface area in a controlled manner because the material can easily deform. In this way, soft robotic actuators can grip objects without damaging them.

Moreover, soft robotic actuators allow for types of motions or combinations of motions (including bending, twisting, extending, and contracting) that can be difficult to achieve with traditional hard robotic actuators.

Figure 1B:
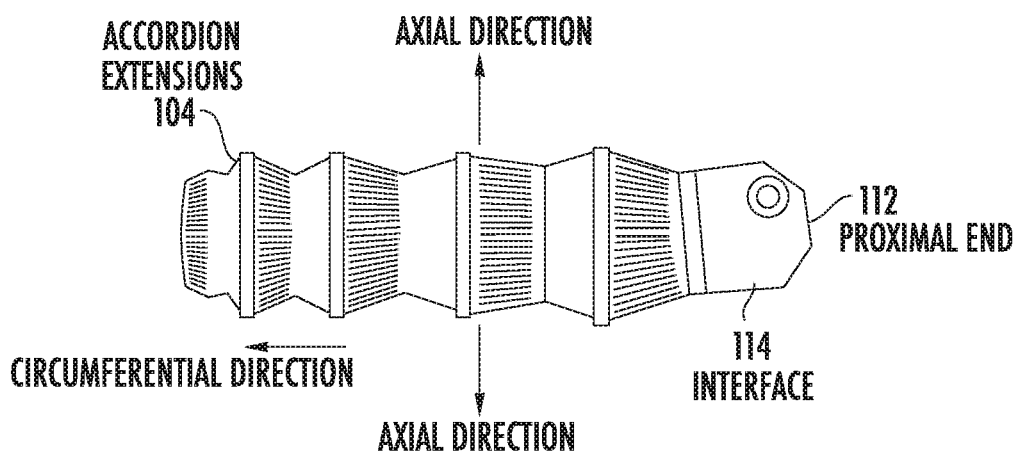
Figure 1C:
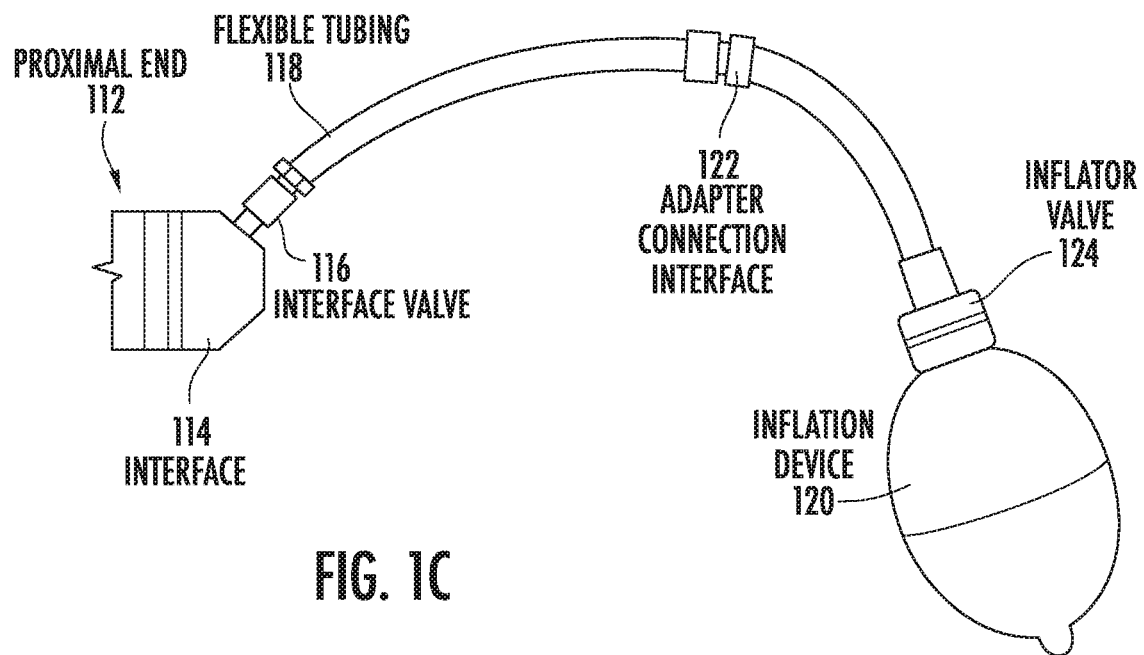
Figure 1D:
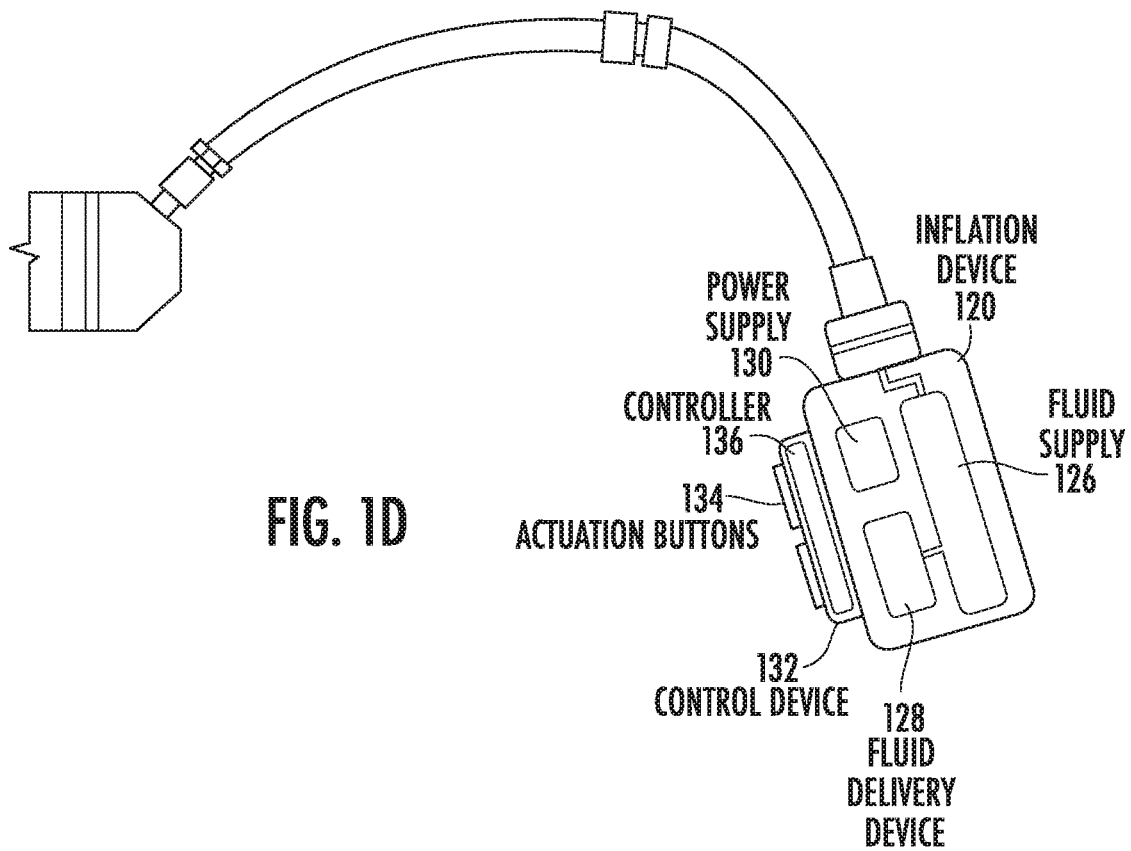

FIGS. 1A-1D depict exemplary soft robotic actuators. More specifically, FIG. 1A depicts a side view of a portion of a soft robotic actuator. FIG. 1B depicts the portion from FIG. 1A from the top. FIG. 1C depicts a side view of a portion of the soft robotic actuator including a pump that may be manipulated by a user. FIG. 1D depicts an alternative embodiment for the portion depicted in FIG. 1C.

An actuator may be a soft robotic actuator 100, as depicted in FIG. 1A, which is inflatable with an inflation fluid such as air, water, or saline. The inflation fluid may be provided via an inflation device 120 through a fluidic connection 118.

The actuator 100 may be in an uninflated state in which a limited amount of inflation fluid is present in the actuator 100 at substantially the same pressure as the ambient environment. The actuator 100 may also be in a fully inflated state in which a predetermined amount of inflation fluid is present in the actuator 100 (the predetermined amount corresponding to a predetermined maximum force to be applied by the actuator 100 or a predetermined maximum pressure applied by the inflation fluid on the actuator 100). The actuator 100 may also be in a full vacuum state, in which all fluid is removed from the actuator 100, or a partial vacuum state, in which some fluid is present in the actuator 100 but at a pressure that is less than the ambient pressure. Furthermore, the actuator 100 may be in a partially inflated state in which the actuator 100 contains less than the predetermined amount of inflation fluid that is present in the fully inflated state, but more than no (or very limited) inflation fluid.

In the inflated state, the actuator 100 may exhibit a tendency to curve around a central axis as shown in FIG. 1A. For ease of discussion, several directions are defined herein. An axial direction passes through the central axis around which the actuator 100 curves, as shown in FIG. 1B. A radial direction extends in a direction perpendicular to the axial direction, in the direction of the radius of the partial circle formed by the inflated actuator 100. A circumferential direction extends along a circumference of the inflated actuator 100.

In the inflated state, the actuator 100 may exert a force in the radial direction along the inner circumferential edge of the actuator 100. For example, the inner side of the distal tip of the actuator 100 exerts a force inward, toward the central axis, which may be leveraged to allow the actuator 100 to grasp an object (potentially in conjunction with one or more additional actuators 100). The soft robotic actuator 100 may remain relatively conformal when inflated, due to the materials used and the general construction of the actuator 100.

The actuator 100 may be made of one or more elastomeric materials that allow for a relatively soft or conformal construction. Depending on the application, the elastomeric materials may be selected from a group of food-safe, biocompatible, or medically safe, FDA-approved materials. The elastomeric materials may also be a fluoropolymer elastomer for chemical resistance. The actuator 100 may be manufactured in a Good Manufacturing Process ("GMP")-capable facility.

The actuator 100 may include a base 102 that is substantially flat (although various amendments or appendages may be added to the base 102 in order to improve the actuator's gripping and/or bending capabilities). The base 102 may form a gripping surface that grasps a target object.

The actuator 100 may include one or more accordion extensions 104. The accordion extensions 104 allow the actuator 100 to bend or flex when inflated, and help to define the shape of the actuator 100 when in an inflated state. The accordion extensions 104 include a series of ridges 106 and troughs 108. The size of the accordion extensions 104 and the placement of the ridges 106 and troughs 108 can be varied to obtain different shapes or extension profiles.

Although the exemplary actuator of FIGS. 1A-1D is depicted in a "C" or oval shape when deployed, one of ordinary skill in the art will recognize that the present invention is not so limited. By changing the shape of the body of the actuator 100, or the size, position, or configuration of the accordion extensions 104, different sizes, shapes, and configurations may be achieved. Moreover, varying the amount of inflation fluid provided to the actuator 100 allows the actuator 100 to take on one or more intermediate sizes or shapes between the un-inflated state and the inflated state. Thus, an individual actuator 100 can be scalable in size and shape by varying inflation amount, and an actuator can be further scalable in size and shape by replacing one actuator 100 with another actuator 100 having a different size, shape, or configuration.

The actuator 100 extends from a proximal end 112 to a distal end 110. The proximal end 112 connects to an interface 114. The interface 114 allows the actuator 100 to be releasably coupled to other parts of a robotic system. The interface 114 may be made of a medically safe material, such as polyethylene, polypropylene, polycarbonate, polyetheretherketone, acrylonitrile-butadiene-styrene ("ABS"), or acetal homopolymer. The interface 114 may be releasably coupled to one or both of the actuator 100 and the flexible tubing 118. The interface 114 may have a port for connecting to the actuator 100. Different interfaces 114 may have different sizes, numbers, or configurations of actuator ports, in order to accommodate larger or smaller actuators, different numbers of actuators, or actuators in different configurations.

The actuator 100 may be inflated with an inflation fluid supplied from an inflation device 120 through a fluidic connection such as flexible tubing 118. The interface 114 may include or may be attached to a valve 116 for allowing fluid to enter the actuator 100 but preventing the fluid from exiting the actuator (unless the valve is opened). The flexible tubing 118 may also or alternatively attach to an inflator valve 124 at the inflation device 120 for regulating the supply of inflation fluid at the location of the inflation device 120.

The flexible tubing 118 may also include an actuator connection interface 122 for releasably connecting to the interface 114 at one end and the inflation device 120 at the other end. By separating the two parts of the actuator connection interface 122, different inflation devices 120 may be connected to different interfaces 114 and/or actuators 100.

The inflation fluid may be, for example, air or saline. In the case of air, the inflation device 120 may include a hand-operated bulb or bellows for supplying ambient air. In the case of saline, the inflation device 120 may include a syringe or other appropriate fluid delivery system. Alternatively or in addition, the inflation device 120 may include a compressor or pump for supplying the inflation fluid.

The inflation device 120 may include a fluid supply 126 for supplying an inflation fluid. For example, the fluid supply 126 may be a reservoir for storing compressed air, liquefied or compressed carbon dioxide, liquefied or compressed nitrogen or saline, or may be a vent for supplying ambient air to the flexible tubing 118.

The inflation device 120 further includes a fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity. To supply the electricity, the inflation device 120 may include a power supply 130, such as a battery or an interface to an electrical outlet.

The power supply 130 may also supply power to a control device 132. The control device 132 may allow a user to control the inflation or deflation of the actuator, e.g. through one or more actuation buttons 134 (or alternative devices, such as a switch). The control device 132 may include a controller 136 for sending a control signal to the fluid delivery device 128 to cause the fluid delivery device 128 to supply inflation fluid to, or withdraw inflation fluid from, the actuator 100.

Instead of, or in addition to, manually triggering inflation, the controller 136 may also be programmed to automatically inflate or deflate the actuator 100 under certain conditions.

As used herein, an actuator typically refers to a single component resembling the actuator 100. When multiple actuators are employed together to form a gripping system that grips a target, such a system is generally referred to as a gripper (although some grippers may consist of a single actuator that grips a target in isolation) or an end-effector.

Embedded or Portable Pneumatic Systems

Exemplary embodiments are next described relating to embedded or portable pneumatic control systems for self-contained soft robotic systems such systems may allow a soft robotic system to operate without a tether that provides an inflation fluid supply line (although in some embodiments, an interface may be provided to receive an electrical connection for power; this electrical connection may interface with the robotic arm on which the soft robotic system is mounted, or some other source of power). In exemplary embodiments described below, the inflation fluid is compressed air, although one of ordinary skill in the art will recognize that other inflation fluids may also be used.

Creating an air supply for a self-contained soft robotic control system may involve using a compressor to pressurize ambient air. Alternatively or in addition, the release of a stored pressurized or liquefied gas media may be used to actuate the end effector. Typical industrial air compressors may not be suitable for integration into a self-contained mobile system because of they weigh tens to hundreds of pounds and consume hundreds of watts of electricity. More preferably, exemplary embodiments employ miniaturized compressors that operate at low DC voltages using brushless or brushed DC motors that are designed for use within portable or battery operated pneumatic systems. Exemplary compressors may occupy volumes smaller than 1 cu. in, weigh less than 0.5 oz, and require less than 0.5 W peak power. Larger models are capable of flow rates up to 5 scfm, and can achieve static pressures as high as 150 psi. One of ordinary skill in the art will recognize that these specifications are exemplary only, and that different compressors may be used depending on the particular application.

Smaller soft robotic actuators typically grasp objects utilizing pressures ranging from 2-15 psi and each consume 0.05 to 0.15 standard liters of air (2-7 milli-moles). A partial vacuum may be alternately applied to spread the actuators apart on release of an object. Larger objects can be manipulated by creating interfacing hubs which integrate a plurality of small or medium sized actuators.

Simple actuation can be achieved by directly connecting the compressor to the actuators. However, even a small end effector with an optimal compressor selection of the type previously described will yield closing actuation speeds limited to seconds or hundreds of milliseconds in length, rather than the tens of milliseconds typical for comparable tethered systems. Typically, these speeds are sufficient for some mobile tasks, where the need to grasp objects is infrequent and insensitive to speed of closure (e.g., when the manipulation target is not moving within the reference frame of the mobile system).

Figure 2:
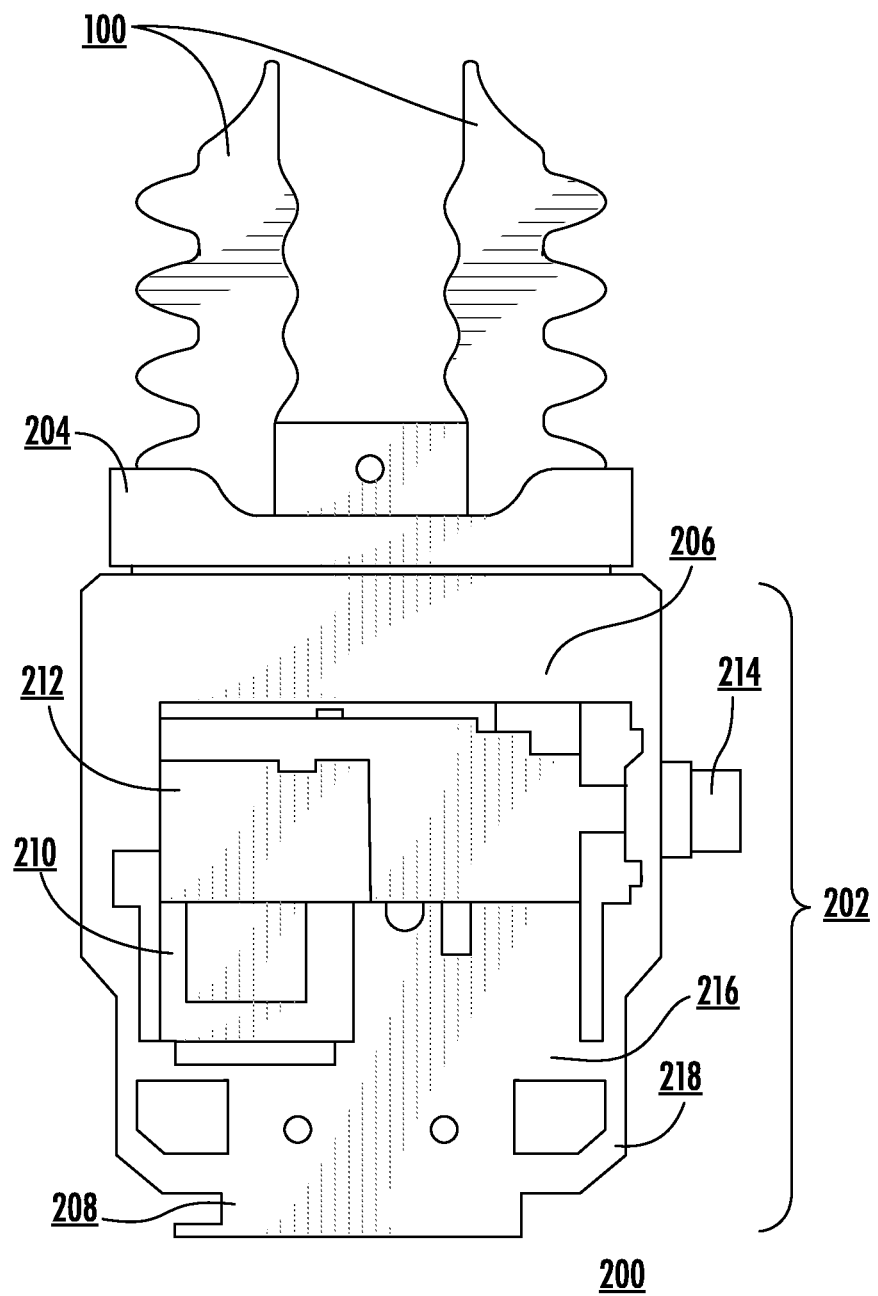
FIG. 2 depicts an exemplary embodiment of a simple self-contained soft robotic control system which drives an integrated actuator hub directly from a micro-compressor via a miniature directional control valve.

An exemplary embodiment of one such simple self-contained soft robotic control system is depicted in FIG. 2.

In the depicted embodiment, a soft robotic end effector system 200 includes two soft robotic actuators 100 (although more or fewer actuators may be employed, depending on the application). The actuators 100 connect to a first side of a hub body 202 via an actuator interface hub 204. The actuator interface hub 204 may be configured to securely connect the actuators 100 to the hub body 202 and to lock the actuators 100 into place on the hub body 202. The actuator interface hub 204 may include an interface for connecting to an actuator connection 206. The actuator connection 206 may form a passage in fluid communication with a pressure source internal to the hub 202. In some embodiments, the pressure source may be external to the hub 202 and mounted to the hub 202, or may be partially internal and partially external to the hub 202. The passage may supply inflation fluid from the pressure source to the actuators 100.

On a second side of the hub body 202, a mounting interface 208 may be provided for interfacing with a robot, such as a robotic arm. For example, the mounting interface 208 may be a flange, or may be another type of mechanical or non-mechanical connection. The robot may have a corresponding interface configured to mate with the mounting interface 208 and to secure the hub 202 to the robot.

The above-noted pressure source may be, for example, a compressor 210. One exemplary embodiment utilizes a diaphragm compressor which occupies a volume just under 4 cu. in and utilizing 8 W or less of electrical power at a DC voltage of 12V. The exemplary compressor 210 is capable delivering 0.22 scfm or more and achieving static pressures of up to 24 psi.

The compressor 210 may be relieved and controlled using a directional control valve 212 controlled by a control/sensor circuit 216. For example, the directional control valve 212 may be a direct acting five-way two-position spool valve having a feedback pressure integrated within the control circuitry 216.

In some embodiments the compressor 210 may, in conjunction with the control valve 212, selectively apply positive pressure or negative pressure (e.g., a partial vacuum). In embodiments without an ability to generate vacuum within the actuators 100, the actuators 100 may be spread using a centrally mounted spanning plate.

The compressor 210, valve 212, and/or control circuitry 216 may be electrically powered and/or may utilize signals generated by other components of the robot. For these purposes, an electrical and/or signal connection interface 214 may be provided for receiving electricity and/or signals, and/or for transmitting signals from the control/sensor circuit 216 to other parts of the robot.

The above-described components of the hub 202 may be present inside a housing 218. The housing 218 may fully or partially encompass these components. In some embodiments, an outer wall of the housing may include voids or passages providing paths, e.g. for an inflation fluid.

In an exemplary embodiment, the entire self-contained control system and end effector fits within an envelope of 100 cu. in or smaller and weighs 1.9 lb or less. Closing actuation of two small actuators integrated into a sealed interface hub can be achieved in 750 ms or less and opening actuation can be achieved via exhaust in 250 ms or less.

Figure 3:
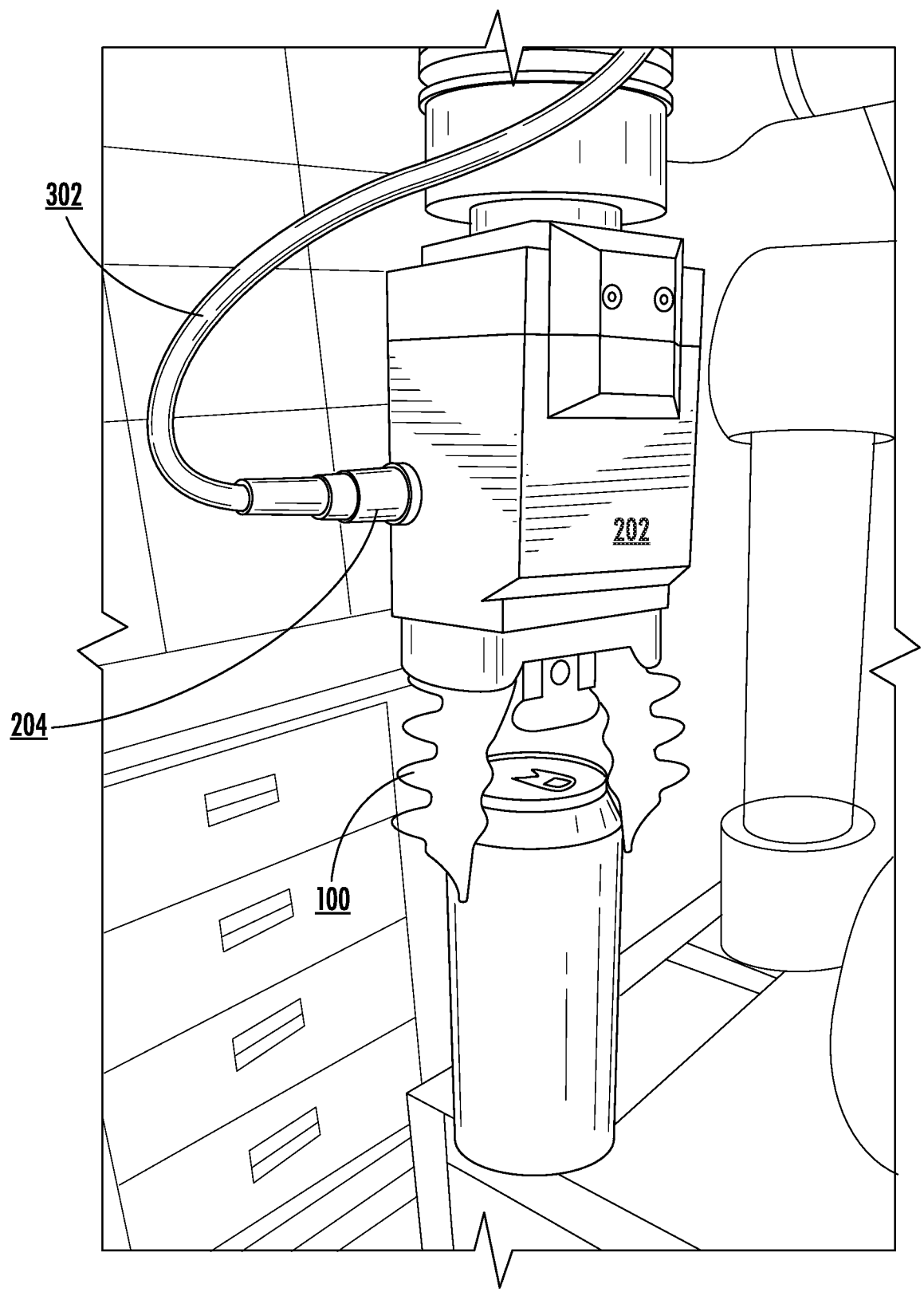
FIG. 3 depicts an exemplary pneumatic self-contained soft robotic control system installed onto a light-weight robotic manipulator and grasping a target object.

FIG. 3 depicts the pneumatically self-contained soft robotic control system of FIG. 2 installed onto a light-weight robotics manipulator and grasping a grasp target (a 16 oz beverage container weighing about 1.5 lbs). This embodiment does not require any external supply of compressed air, and utilizes the host manipulator's onboard 24V DC power supply to source its electrical demands via a cable 302 attached to the electrical and/or signal connection interface 214.

Even miniaturized compressors are designed for use at a predetermined and ideally efficient operating point. This operating point will be a steady state condition which provides a particular flow rate and some amount of delivered positive pressure or vacuum. Such compressor applications deliver large volumes of compressed air over long periods of time at steady low instantaneous flow rates. This may not be ideal for a soft robotics control system, which seeks to deliver small volumes of air at relatively high instantaneous flow rates (>10 scfm) and low pressures (often <10 psi). Multiple means of adapting a compressor-based system to these objectives are proposed in the following sections.

Operating a Micro Pneumatic Compressor Out of Specification to Improve Dynamic Response To improve actuation speeds by increasing instantaneous flow rates, in some embodiments, a small pneumatic compressor may be operated outside of its nominal specifications. In mobile robotics and mechatronic systems where weight and form factor are critical constraints, motors may be "down-sized" by operating a smaller motor outside of its continuous duty voltage, current, rotary speed, or temperature specifications to achieve the same results a larger motor could safely deliver under continuous duty dynamically (for short and variable periods of time). Such a strategy may also be applied to miniature compressors.

There are several methods of augmenting the performance of a DC brushed or brushless compressor motor. The motor, if controlled via closed loop voltage/power delivery, may be operated at a higher than nominal voltage for short periods of time (such as temporarily driving a 12V nominal DC motor at 24V). Similarly, a motor controlled via closed loop current/torque application can be over-driven with higher than nominal current. Both methods effectively alter the thermal operating condition of the motor, causing its windings and load bearing components to become hotter than usual. The motor may still utilize the same compressor head, but is now capable of driving it at higher speeds given any particular back pressure. A higher reciprocating speed on a diaphragm or piston type micro compressor will correspond to a higher instantaneous flow rate.

This method may imply a negative impact on overall operating life and energy efficiency of the compressor. Operating the compressor at higher reciprocation rates or pressures will lead to higher loads that can cause load or friction bearing components to break prematurely. This problem may be circumvented in soft robotic control systems via various means singularly or in combination. If the end application requires a low actuation duty cycle (actuations need to be fast when performed but are demanded infrequently) then the compressor can be activated infrequently. Thermal monitoring can be established which automatically applies closed loop control of the motor's power delivery and continuously varies actuation performance to maintain a specific thermal loading. Furthermore, any combination of passive or active thermal management techniques can be employed to augment the motor's ability to quickly dissipate heat. These may include but are not limited to; heatsinking, convection, forced air cooling, passive liquid cooling, and recirculating liquid cooling.

In another embodiment, active cooling strategies may be employed to control these elevated temperatures within the structural interfacing hub by utilizing the pressurized actuation media itself conveyed via strategically placed heat exchanging fluid conduction paths proximal to the compressor DC motor casing.

Due to the inherent properties of ideal gases, there a substantial temperature change induced as pressurized gas is rapidly conveyed to the actuators and allowed to expand within them. The principle behind this is known as the Joule-Thomson effect, where a pressure drop causes a change in temperature in a gas or liquid. Thus, the actuation media conveyed to the actuator is naturally cooled and if routed within a heat exchanger proximal to the compressor motor as described above, can act as a heat recovery system which simultaneously provides forced air cooling of the motor and increases the pressures developed within the soft actuator by increasing the gas' temperature.

Reconfiguring Twin Head Compressors

One method of increasing compressor flow capacity or maximum achievable pressure utilizes multiple compressors configured in parallel (for higher flow) or series (for higher pressure) arrangement. Compressors which feature a "twin head," that is, a single doubly shafted motor driving two reciprocating piston, vane, or diaphragm compressor stages may be utilized for this purpose. These can be configured in a manner similar to two physically separate compressors (in parallel or in series). A self-contained soft robotic control system can achieve enhanced flow performance by creating a pneumatic control scheme which enables dynamic selection between these two configurations when each is more efficient. FIGS. 4A-4D depict such an embodiment.

Figure 4A:
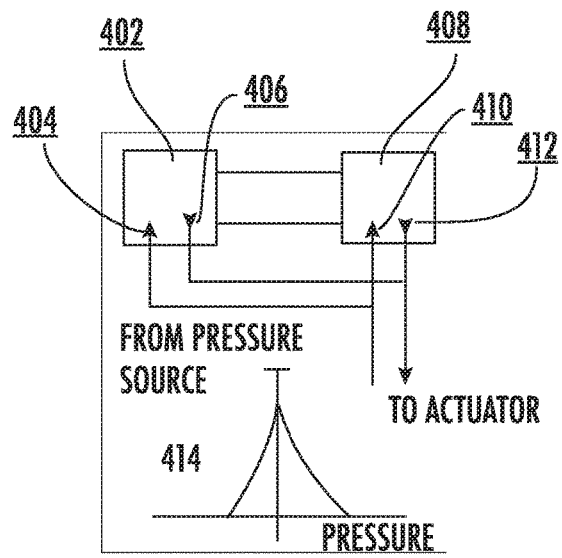
FIGS. 4A-4D depict an exemplary embodiment in which a twin compressor is operated in conjunction with a solenoid driven directional control valve to create a combined target flow profile.
Figure 4B:
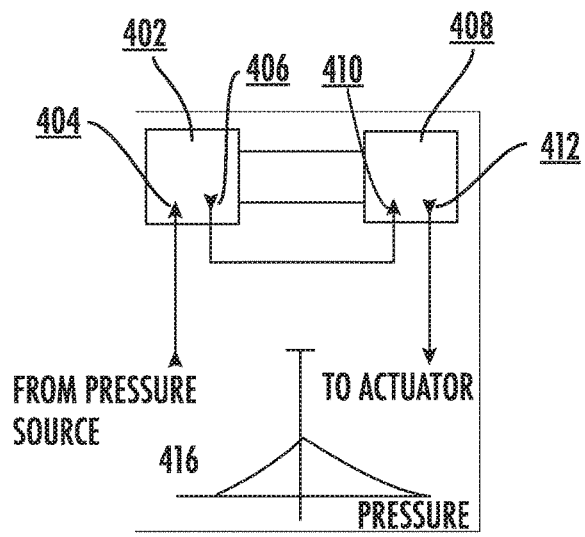
Figure 4C:
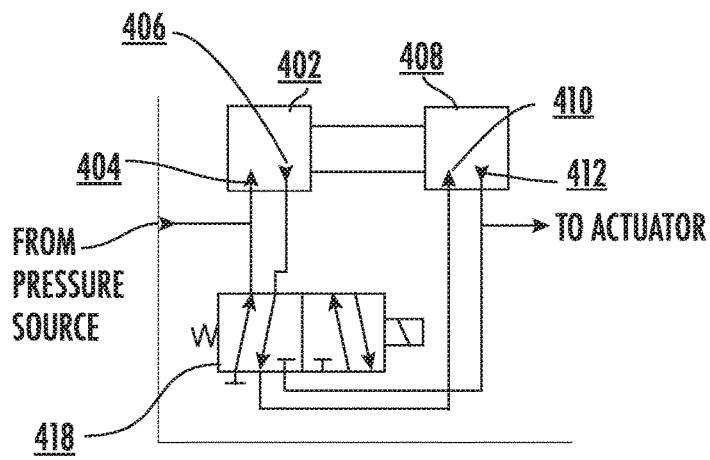

As shown in FIGS. 4A-4C, a compressor may include a first compressor head 402 and a second compressor head 408. The first compressor head 402 may include an inlet 404 and an outlet 406. The second compressor head 408 may also include an inlet 410 and an outlet 412.

FIG. 4A depicts the compressor heads 402, 408 connected in a parallel arrangement. In order to achieve this configuration, the inlet 404 of the first compressor head 402 and the inlet 410 of the second compressor head 408 may both be connected in parallel to a pressure source. Similarly, the outlet 406 of the first compressor head 402 and the outlet 412 of the second compressor head 408 may both be connected in parallel to an actuator. When configured in a parallel arrangement, the compressor can deliver elevated instantaneous flow rates at lower pressures but is incapable of achieving higher pressures, as shown in the flow/pressure graph 414.

FIG. 4B depicts the compressor heads 402, 408 in a series arrangement. To achieve this configuration, the inlet 404 of the first compressor head 402 is connected to the pressure source, and the outlet 406 of the first compressor head 402 is connected to the inlet 410 of the second compressor head 408. The outlet 410 of the second compressor head 412 is connected to an actuator. In the series configuration, where the output of the first stage is taken as the input of the second, the compressor delivers lower instantaneous flow rates at low pressures but significantly improved rates at higher pressures and can achieve a higher final static pressure, as shown in the flow/pressure graph 416.

FIG. 4C depicts a reconfigurable arrangement in which the first compressor head 402 and the second compressor head 408 are connected via control circuit 418 that includes a set of valves for controlling where the respective inlets and outlets of the compressor heads connect.

Figure 4D:
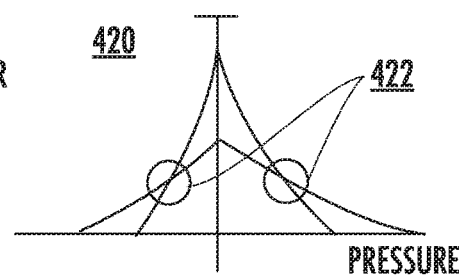

As shown in FIG. 4D, at a critical operating point in the process of pressurizing a soft actuator, the flow profiles of each compressor configuration intersect (FIG. 4D is a pressure/flow graph 420 effectively superimposing the parallel configuration pressure flow graph 414 on the series pressure/flow graph 416). At the points of intersection 422, the control circuit 418 may be configured to switch the compressor configuration to the opposing mode for the remainder of the actuation process, delivering the highest possible instantaneous flow at every point throughout actuation. An analogous method of reconfiguration can be utilized in the application of partial vacuum.

Furthermore, a sufficiently complex pneumatic control circuit utilizing multiple directional control valves can be developed such that four modes of operation can be electronically selected for a single compressor; parallel pressure generation, serial pressure generation, parallel vacuum generation, and serial vacuum generation. This constitutes an efficient embedded control system for any bi-modal (pressure and vacuum operated) soft robotic end effector. The following section will describe additional methods which may be used independently or in combination with the aforementioned compressor control methods to further enhance the performance of a self-contained soft robotic control system.

Figure 5C:
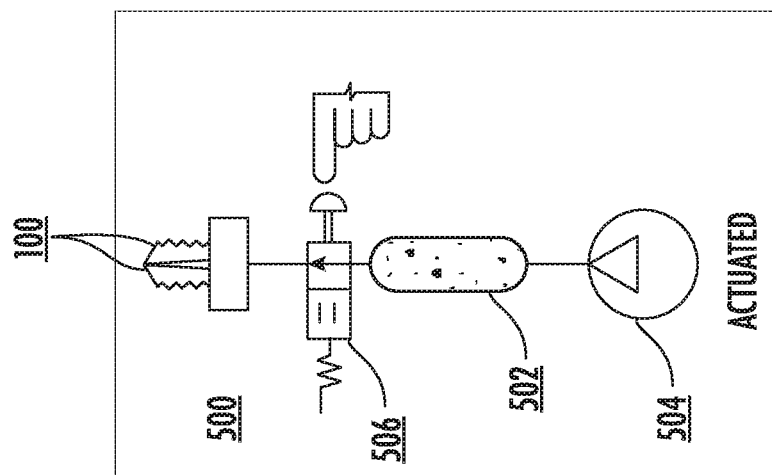
FIGS. 5A-5C depict an exemplary embodiment in which an accumulator actuates soft robotic actuators.
Figure 5B:
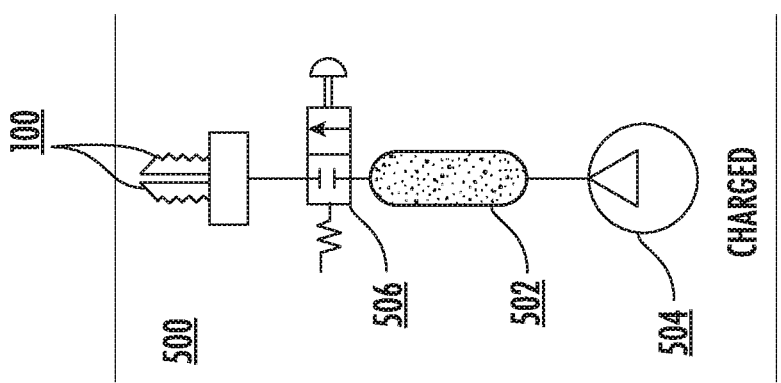
Figure 5A:
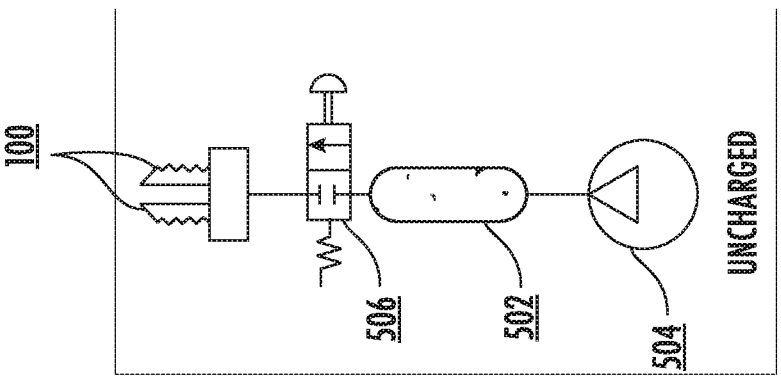

Accumulators as a Means of Releasing or Temporarily Storing Pressurized or Liquefied Actuation Media As shown in FIGS. 5A-5C, a self-contained soft robotic control system 500 may be further augmented by providing a volume 502 to temporarily accumulate actuation media pressurized by a compressor 504 or to controllably release a stored gaseous or liquefied actuation media under significantly elevated pressure. These volumes 502 may be created using commonly available cylindrical or circular tanks or may be intricately integrated within recesses or voids designed into the soft actuators' interfacing hub 506. FIGS. 5A-5C depict examples of accumulators in an uncharged state (FIG. 5A) and a charged state (FIG. 5B), and a system in which actuators have been actuated through action of the accumulator (FIG. 5C).

By providing a volume 502 in which to "pre-compress" the actuation media ahead of time in a compressor-driven system 500 using exemplary accumulators, very fast actuation times can be achieved (e.g., tens of milliseconds, which is similar to those of tethered soft robotics control systems). Thus, the compressor 504 "charges" the accumulator relatively slowly (e.g., over several seconds or longer) until a specific pressure is achieved at which point the system is ready to perform a single actuation quickly. The load on the compressor 504 is greatly alleviated which lowers the maximum instantaneous power consumption of the embedded system by distributing those demands over a longer period of time. This improvement may be particularly well-suited to a system having an operational duty cycle in which actuation must be comparably fast to tethered systems but is only occasionally demanded.

Furthermore, highly efficient embodiments of this concept may be designed by employing multiple accumulators, which serve to separately accumulate positive pressure for closing actuation when released or partial vacuum for opening actuation when exposed. Each may be sized and pressurized such that, when a fluid conduction path is created between the accumulator and integrated end effector, a predetermined amount of actuation pressure or partial vacuum is achieved solely as a consequence of the actuation media equilibrating within the now larger connected volume (without further intervention on the part of the compressor).

Inflation Profile Control

One nuance of most soft robotic actuators is that the shape of the inflation depends upon the input flow profile. For example, a rapid burst of pressurized air (similar to an impulse control input) will cause the distal end of the actuator to curl faster than the rest of the actuator because of the higher dynamic pressure in that region. Letting pressurized air flow into the actuator at a slower controlled rate will create a more constant curvature profile throughout the actuator and thus a different overall grip on the manipulation target. These differing grip profiles can be controlled or selected to improve grip quality on a manipulation with particular know spatial or physical characteristics (e.g. an object with broad nearly circular cross section versus an object with a generally thin high aspect ratio cross section). This type of control can be achieved by adding a flow control valve at the interface hub's pneumatic input to more precisely and dynamically control the flow profile. Flow control valves can also be used to prevent a pressurized accumulator from the previously described embodiment from releasing a high pressure pulse of air too quickly, thereby damaging the elastomer of the actuator. Alternatively or in addition, a directional control valve can be specified for activation/deactivation which features a flow coefficient that is sufficiently restrictive to serve the same purpose.

Combustion Powered Actuation

Electrically powered compressors may suffer from several limitations which make them a burden on any self-contained soft robotic control system. First, compressors require large amounts of power provided by an equally large internal battery or an external power source. The latter option reduces the degree to which the system is truly independent. Second, compressors cannot supply rapid and highly energetic pressure profiles without relying upon the embodiments previously described or allocating additional space and power to an oversized compressor. While these augmenting embodiments dramatically improve the performance of a compressor based system, they are difficult to implement within a real system and time consuming to optimize.

To circumvent the issues associated with the use of a compressor, pressurized gas may be generated via combustion inside of a reaction chamber. In some embodiments, liquid fuels may be employed. Liquid fuels have extraordinarily high energy densities and a few droplets that are vaporized within a reaction chamber and subsequently ignited create large amounts of high temperature pressurized gas. In further embodiments, other materials, such as sodium azide, may undergo a gas-producing reaction.

This gas can be used as the pressurizing fluid for operating an actuator. This approach is advantageous since it is a faster process than using an electric compressor to pressurize an accumulator and can pressurize the reaction chamber to higher pressures than many small electric compressors are capable of.

The interior of the reaction chamber may be coated with a material that partially or fully quenches byproducts of the reaction. By quenching these byproducts in the reaction chamber, the byproducts can be prevented from entering the actuator, thus protecting the actuator from potentially harmful chemical exposure, and prolonging the lifespan of the actuator.

In this embodiment the accumulator may dissipate some of the shock, heat, and reactive intermediates from combustion. This is in contrast to a system in which combustion is performed in the soft actuator itself, subjecting the elastomer to permanent damage which impairs the life and function of the actuator. The pressurized gas created within the staging reaction chamber may have ample time to cool between actuations under typical conditions. This allows tar and decomposed material to build up on the interior of the reaction chamber rather than the soft actuator. Similarly, sufficient time is provided for the natural quenching of free radicals created during the energetic combustion process. Subsequently, this cooled and pressurized gas serves the same function as that pressurized within an accumulator in previously described embodiments.

Self-Contained Soft Robotic End Effector Systems

Figure 6A:
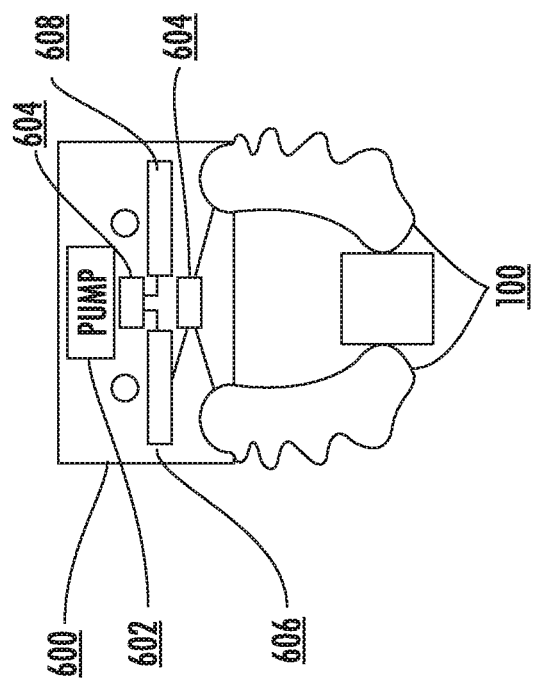
FIGS. 6A-6B depict exemplary hub assemblies integrating a pump, valves, and accumulators.
Figure 6B:
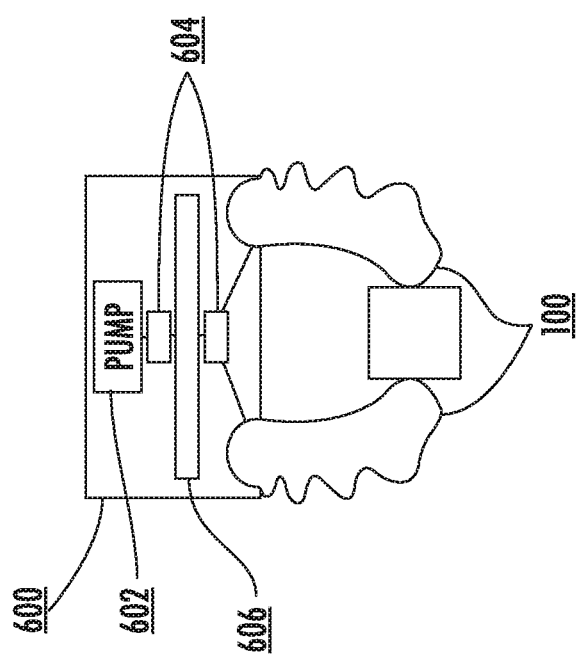

FIGS. 6A-6B depict an example of a hub 600 integrating a pump 602, one or more valves 604, and one or more accumulators. FIG. 6A depicts a system in which an accumulator 606 functions as a positive pressure vessel. FIG. 6B depicts a two-piece accumulator design where one accumulator 606 is a positive pressure vessel and the other 608 is a negative pressure vessel.

Hub-Integrated Accumulator

Figure 7:
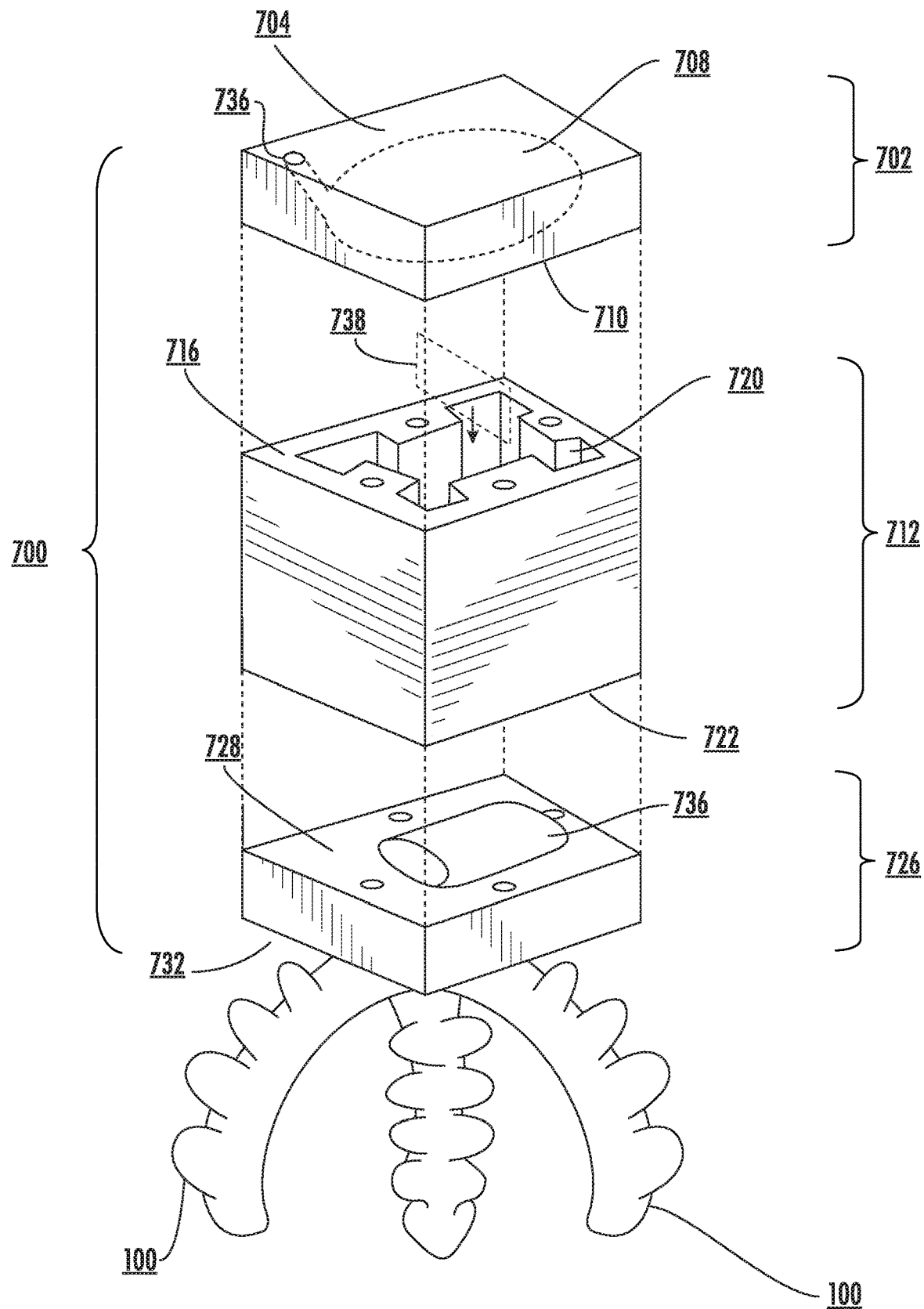
FIG. 7 depicts an exemplary 3-piece hub assembly.

FIG. 7 depicts a three-piece hub 700 where the top piece includes the pump, valves and electronics necessary to run the system.

The hub 700 includes a first hub part 702. The first hub part 702 has a first end 704 which supports an interface, such as a flange, for mounting the hub 700 to a robotic system. The first hub part 702 further includes a pump 708 for pumping an inflation fluid, and a second end 710 that includes or is configured to be a second-hub-part connector for connecting to a second hub part 712. The second end 710 may also include a pump interface for receiving an inflation fluid from the pump.

The second hub part 712 may have a first end 716 that includes or is configured to be a first-hub-part connector configured to mate with the second-hub-part connector of the first hub part 702. The first end 716 may also include a fluid interface for receiving the inflation fluid from the pump interface. The second hub part 712 may also have an integrated accumulator 720 connected to the fluid interface for storing the inflation fluid under pressure. A second end 722 of the second hub part 712 may include or may be configured as a third-hub-part connector. An accumulator interface in the second end 722 may receive inflation fluid from the accumulator and deliver the inflation fluid to a third hub part 726.

The third hub part 726 may include a first end 728 that has or is configured to be a third-hub-part-to-second-hub-part connector that mates with the third-hub-part-connector of the second hub part 712. The third hub part 726 may also include and a pressurized fluid interface for receiving the pressurized inflation fluid from the accumulator interface. The third hub part 726 may further include a second end 732 having an actuator interface for supplying pressurized inflation fluid to an actuator 100. The third hub part 726 may also include a valve 736 for controlling a flow of the pressurized inflation fluid to the actuator 100.

Optionally, at the outlet of the valve 736 a heat sink could be included to perform a heat exchange process, as in the heat management examples discussed above.

In this embodiment, the hub 700 contains all the systems for a soft robotic end effector: a power source, compressor in the form of a pump, pressure/vacuum accumulator, directional control valves, actuator interface hub, and soft actuators. The hub 700 serves as the structural element for the assembly; all of the sub-systems are rigidly attached to the hub and any external forces—other than those felt by the soft actuators 100—are supported by it. Consequently, this hub 700 may be designed to be mechanically robust while keeping a lightweight and compact form factor.

The depicted embodiment includes an accumulator 720. Conventional accumulators take the form of a cylinder with spherical ends, which may reduce stress concentrations and allow for high proof pressure. In order to optimize space and weight constraints, the accumulators 720 of the exemplary embodiments may be integrated within the structural interfacing hub by design. At the relatively low pressures developed within a self-contained soft robotic control system (<40 psi) this integrated accumulator 720 needn't be of circular profile and can be designed into thin rectangular or complexly shaped voids that would naturally be present in the material construction of the interfacing hub. Higher-pressure applications, >40 psi, may utilize miniature cylindrical or spherical accumulators or hub integrated accumulators with a reinforced spherical or cylindrical body.

Furthermore, depending on the application requirements different materials can be employed for this purpose, such as soft metals (brass/aluminum), composites (carbon fiber/fiberglass), or plastics.

As shown in FIG. 7, an exemplary three-piece hub 700 has an incorporated pressure vessel that serves as the body and structure of the hub itself. Additive manufacturing techniques may be used when complex channels or features are required to further minimize space within the assembly. A two-accumulator design can also be achieved using a septum 738 where both positive and negative pressure reserves are needed.

Embedded Pneumatic Channeling/Routing of Tubing

As an extension to the aforementioned integrated accumulator, any necessary pneumatic routing 738 can be similarly integrated within the structural body of the interfacing hub. This allows such fluid conduction paths to be optimized for minimal flow resistance and to eliminate the need for bulky external tubes and connectors.

The invention claimed is:

1. A robotic system comprising:
   a soft actuator comprising an elastomeric bladder configured to receive an inflation fluid;
   a hub comprising:
      a first end having an actuator interface configured to receive the soft actuator,
      a second end having a mounting interface configured to be mounted to a robotic arm, and
      a hub body having a pressure source configured to supply the inflation fluid through the actuator interface to the soft actuator; and
   a control valve configured to control a flow of inflation fluid in at least one of a direction into the actuator or a direction out of the actuator, wherein the soft actuator is located at a distal end of the robotic system and is configured with a gripping surface positioned to grasp a target object.

2. The system of claim 1, wherein the control valve is a directional control valve for selectively allowing inflation fluid to flow in a first direction into the actuator or in a second direction out of the actuator.

3. The system of claim 1, wherein the control valve is a flow control valve for controlling a rate of a flow of the inflation fluid into or out of the actuator.

4. The system of claim 1, wherein the pressure source is a compressor.

5. The system of claim 4, wherein the compressor occupies a volume smaller than 1 cubic inch.

6. The system of claim 4, wherein the compressor weighs less than 0.5 oz.

7. The system of claim 4, wherein the compressor operates at less than 0.5 W of peak power.

8. The system of claim 1, wherein the pressure source is a twin head compressor operable in parallel or in series depending on configuration of a compressor-associated valve.

9. The system of claim 8, further comprising a controller configured to activate the valve at a time corresponding to when flow profiles of each compressor head intersect.

10. The system of claim 1, further comprising a motor for operating the pressure source, wherein the motor is configured to operate in an overpowered mode during actuation of the actuator.

11. The system of claim 10, wherein the motor is configured to operate in the overpowered mode by receiving a higher than normal voltage during actuation of the actuator.

12. The system of claim 10, further comprising a heat exchanger disposed proximal to the motor to exchange heat between the motor and the inflation fluid.

13. The system of claim 1, wherein the pressure source is configured to supply inflation fluid to the soft robotic actuator until the soft robotic actuator is pressurized to between 2 and 15 psi.

14. The system of claim 1, wherein the pressure source is configured to supply 0.05 to 0.15 liters of the inflation fluid to the soft robotic actuator.

15. A robotic system comprising:
   a soft actuator comprising an elastomeric bladder configured to receive an inflation fluid;
   a hub comprising:
      a first end having an actuator interface configured to receive the soft actuator,
      a second end having a mounting interface configured to be mounted to a robotic arm, and
      a hub body having a pressure source configured to supply the inflation fluid through the actuator interface to the soft actuator; and
   an accumulator for receiving the inflation fluid from the pressure source and storing the inflation fluid under pressure, wherein the soft actuator is located at a distal end of the robotic system and is configured with a gripping surface positioned to grasp a target object.

16. The system of claim 15, further comprising a plurality of accumulators, at least one of which is configured as a positive pressure vessel and at least one of which is configured as a negative pressure vessel.

17. The system of claim 15, wherein the accumulator is at least one accumulator, and the at least one accumulators are collectively sized so that, when a fluid conduction path is created between the one or more accumulators and the actuator, a predetermined actuation pressure or partial vacuum is achieved.

18. A robotic system comprising:
   a soft actuator comprising an elastomeric bladder configured to receive an inflation fluid; and
   a hub comprising:
      a first end having an actuator interface configured to receive the soft actuator,
      a second end having a mounting interface configured to be mounted to a robotic arm, and
   a hub body having a pressure source configured to supply the inflation fluid through the actuator interface to the soft actuator, wherein the pressure source is a reaction chamber distinct from the actuator, the reaction chamber configured to accommodate a chemical reaction which generates a gaseous product, and wherein the soft actuator is located at a distal end of the robotic system and is configured with a gripping surface positioned to grasp a target object.

* * * * *